US011146379B1

(12) United States Patent
Ackley-Smith et al.

(10) Patent No.: US 11,146,379 B1
(45) Date of Patent: Oct. 12, 2021

(54) CREDENTIAL CHAINING FOR SHARED COMPUTE ENVIRONMENTS

(71) Applicant: Amazon Technologies, Inc., Seattle, WA (US)

(72) Inventors: Chance Ackley-Smith, Royal Oak, MI (US); Dominic Corona, Rochester Hills, MI (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 16/588,743

(22) Filed: Sep. 30, 2019

(51) Int. Cl.
*H04L 29/08* (2006.01)
*H04L 9/00* (2006.01)
*H04L 9/32* (2006.01)
*H04L 9/08* (2006.01)

(52) U.S. Cl.
CPC ............ *H04L 9/006* (2013.01); *H04L 9/0825* (2013.01); *H04L 9/0866* (2013.01); *H04L 9/3247* (2013.01)

(58) Field of Classification Search
CPC ....... G06F 9/5077; G06F 21/30; H04L 67/32; H04L 9/3213; H04L 9/3247; H04L 9/006; H04L 9/0825; H04L 9/0866; H04L 9/32; H04L 63/08; H04L 63/10
See application file for complete search history.

(56) References Cited

U.S. PATENT DOCUMENTS 10,951,604 B1\* 3/2021 Venkatasubramanian ................... H04L 63/0815
2018/0288130 A1\* 10/2018 Sandfort ................. H04L 67/10

\* cited by examiner

*Primary Examiner* — Olugbenga O Idowu
(74) *Attorney, Agent, or Firm* — Davis Wright Tremaine LLP

(57) ABSTRACT

A transform execution service obtains a first request from a client device of a customer to execute a set of instructions. In response to the request, the service provides the set of instructions and a first set of credentials to a cluster of computer nodes. The cluster submits, to the service, a second request to assume an identity of the customer, where the second request demonstrates access to the first set of credentials. In response to the second request, the service provides a second set of credentials to cause the cluster to use the second set of credentials to access an identity management service to obtain a third set of credentials to exercise a set of permissions associated with the customer. The cluster uses the third set of credentials to exercise a subset of the set of permissions to access a set of resources to execute the set of instructions.

20 Claims, 11 Drawing Sheets

CREDENTIAL CHAINING FOR SHARED COMPUTE ENVIRONMENTS

BACKGROUND

Computing resource service providers and other service providers often manage computing clusters that are shared among a variety of different users in a multi-tenant manner. Each of these computing clusters may execute a set of tasks that may be short-lived, whereby a computing cluster may be released once it has completed execution of its assigned set of tasks. The users that rely on these computing clusters may each belong to different organizations and may have different levels of authorization to various resources provided by a computing resource service provider. This often makes it difficult to perform authentication and authorization processes for each computing cluster in order to allow the computing cluster to execute its assigned set of tasks.

BRIEF DESCRIPTION OF THE DRAWINGS

Various techniques will be described with reference to the drawings, in which.

DETAILED DESCRIPTION

Figure 1:
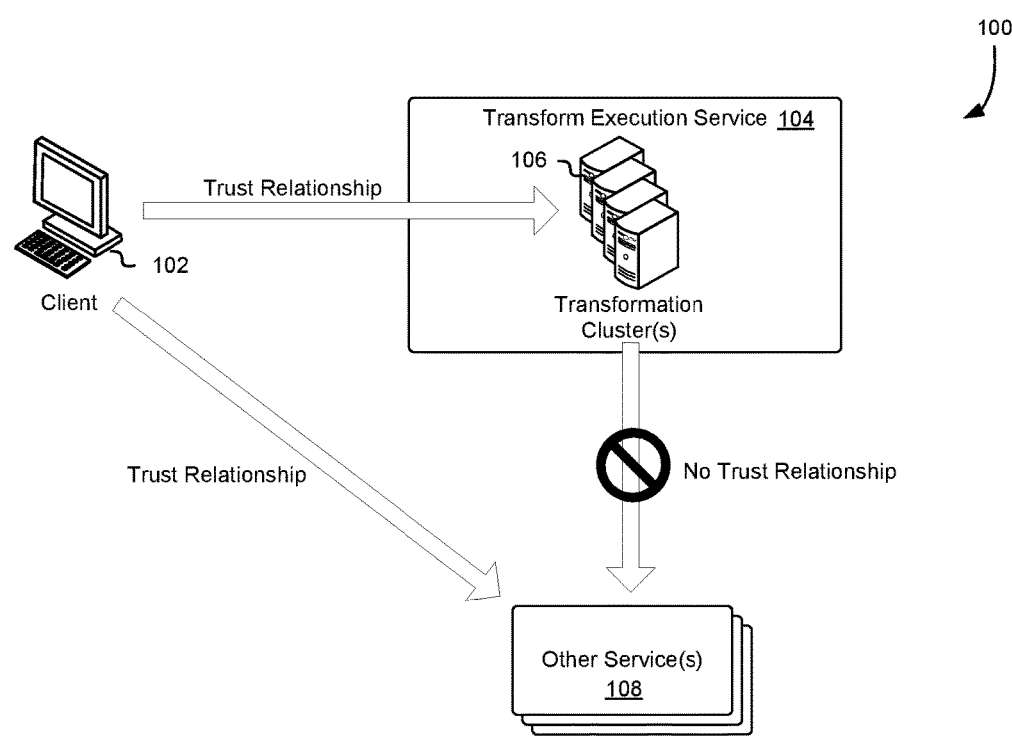
FIG. 1 shows an illustrative example of a system in which transformation clusters of a transform execution service execute transform instructions provided by a client device utilized by a customer of the transform execution service.

Techniques described and suggested herein relate to the distribution and chaining of credentials associated with a customer of a computing resource service provider and of a transform execution service to allow for transformation clusters to assume a customer role and access resources provided by the computing resource service provider. In an example, a customer of a transform execution service transmits, via a client device, a request to the transform execution service to execute a set of transform instructions. The transform instructions may specify tasks that are to be performed using resources provided by a computing resource service provider and associated with the customer through an account profile maintained by the computing resource service provider. In response to the request, the transform execution service may evaluate the transform instructions and, based on this evaluation, identify a transformation cluster that may execute the transform instructions. In an example, the transform execution service assigns to the customer an internal identity from an identity pool maintained by the transform execution service. This internal identity may be used by the transform execution service to associate the transformation cluster to the customer during execution of the transform instructions. The transform execution service may provide, to the customer via the client device, an identifier corresponding to this internal identity assigned to the customer.

For Amazon.com and other companies with huge data sets, special resources are required to allow clients to perform operations on these data sets. For example, a data query of several petabytes of data cannot be performed with a conventional desk top computer. To provide such services for clients, a transform execution service is used to receive a client inquiry and to configure one of more supercomputers (referred to as a cluster) to perform the query or other computing task. This cluster is a shared resource so that once the task is performed for the client, the cluster can be reconfigured for another client.

For security purposes, it is necessary that the cluster not be asked to perform a task for which the client doesn't have permission. For example, sensitive client data such as customer names, order histories, addresses etc. must be protected from unauthorized access. In the past, if the cluster needed to access a cloud computing resource (like Amazon AWS or Microsoft Azure), there was no way to quickly determine if the cluster had the correct security credentials. At a high level, the disclosed technology solves this problem by allowing a customer to assign its security credentials to a cluster so that the cluster can access the computing resources. In one embodiment, when a client registers with the transform execution service, it is given an internal identifier. The client can also obtain an external identification when the client registers and obtains the permissions required to access the cloud computing resources. An identification broker within the transform execution service allows the client to tie or link its external identifier with the internal identifier so that the cluster can use the permissions associated with the client's external identifier to utilize the cloud computing resources. Once the cluster has performed its task, the link can be undone and the cluster no longer has the permissions of the client. Further details of particular embodiments for carrying out this lending of security credentials to a cluster are set forth below.

In one example, the transform execution service generates a cryptographic key pair usable by the transformation cluster to assume the internal identity of the customer within the transform execution service. For instance, the transform execution service may provide, to the transformation cluster, a private cryptographic key of the cryptographic key pair to enable the transformation cluster to digitally sign requests to assume the internal identity of the customer. The transform execution cluster may maintain the public cryptographic key of the cryptographic key pair in a hash table to authenticate the digital signature from the transformation cluster. Thus, as part of the execution of the transform instructions, the transformation cluster may use the private cryptographic key to generate a digital signature that may be used by the transform execution system to authenticate the digital signature and determine that the transformation cluster may assume the internal identity of the customer.

In one example, an identity management service of the computing resource service provider obtains a request from a customer to associate the internal identity of the customer generated by the transform execution service to the customer profile maintained by the identity management service. The request may include the identifier corresponding to this internal identity, as well as a set of permissions that may be used to define a level of access to resources maintained by other services provided by the computing resource service provider. Further, the request may identify a role that an entity assuming the internal identity of the customer may assume in order to access these resources subject to the set of permissions defined by the customer through the identity management service.

In one example, the identity management service obtains a request from the transformation cluster to assume a role associated with the customer. The request may include a set of credentials associated with the internal identity of the customer. For instance, the request may be digitally signed using a second private cryptographic key of a second cryptographic key pair usable by the identity management service to authenticate requests from the transformation cluster assuming the internal identity of the customer. For instance, in response to the request from the transformation cluster, the identity management service may authenticate, using a second public cryptographic key of the second cryptographic key pair, a digital signature generated by the transformation cluster assuming the internal identity of the customer. If the digital signature is authenticated, the identity management service may identify the customer profile associated with the internal identity of the customer to identify the roles that may be assumed by the transformation cluster.

In one example, if the identity management service determines that the transformation cluster is authorized to assume a role of the customer to access one or more other services provided by the computing resource service provider, the identity management service provides, to the transformation cluster, a set of credentials that may be used by the transformation cluster to assume this role. In response to obtaining this set of credentials, the transformation cluster may submit a request to these one or more other services to access a set of resources needed for execution of the transform instructions. In response to the request, a service may transmit the set of credentials to the identity management service to authenticate the request and to obtain permissions tied to the role associated with the customer. Using these permissions, the service may determine whether the transformation cluster is authorized to access the resources specified in the request.

As one skilled in the art will appreciate in light of this disclosure, certain embodiments may be capable of achieving certain advantages. For instance, because the identity management service processes requests from the customer to associate an internal identity of the customer within the transform execution service to the customer identity within the identity management service, these identities may be linked to simplify the process for authentication of the transformation cluster by the identity management service and the other services provided by the computing resource service provider. Further, because the transform execution service selects an internal identity from an identity pool rather than relying on a customer profile or account, the transform execution service can revoke this identity and any underlying credentials upon complete execution of the transform instructions by the transformation cluster without impacting the customer profile or account.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which transformation clusters of a transform execution service execute transform instructions provided by a client device utilized by a customer of the transform execution service. In the system 100, a customer of a transform execution service 104 submits, via a client device 102, a request to the transform execution service 104 to execute a set of transform instructions. The transform execution service 104 may be implemented on a computer system, or virtualization thereof (such as one or more virtual machines operating via a hypervisor), implemented using hardware and software, and may comprise one or more processors and memory that stores executable instructions whose execution by the one or more processors causes the computer system to perform operations described herein. In an embodiment, the transform execution service 104 comprises a set of transformation clusters 106 that are shared among various customers of the transform execution service 104 in a multi-tenant environment for the processing of transform instructions (e.g., compute tasks) on behalf of these customers using the resources of an assigned transformation cluster 106. In an embodiment, the transformation clusters 106 comprise a set of virtual machines that are shared in the multi-tenant environment. For instance, a transformation cluster 106 may comprise compute nodes (e.g., resources) from one or more virtual machines of the set of virtual machines. In an embodiment, a transformation cluster 106 is implemented on one or more physical computing devices through which one or more virtual machines may operate to provide functionality for execution of the transform instructions. Further, a transformation cluster 106 may be provisioned for execution of a set of transform instructions such that, upon completion of this execution of the set of transform instructions, the transformation cluster 106 is released and is made available to any of the customers of the transform execution service 104.

In an embodiment, the customer, via the client device 102, maintains a trust relationship with the transform execution service 104 and the transformation cluster 106 assigned to the customer by the transform execution service 104 in response to the request from the customer to provision a transformation cluster 106 for execution of a set of transform instructions. The trust relationship between the customer, via the client 102, and the transformation execution service 104 may be established through a registration process with the transformation execution service 104. For instance, through the registration process, the transform execution service 104 may verify that the customer is part of a trusted organization or is otherwise associated with an entity deemed to be a trusted entity through vetting of the entity by an administrator or security group associated with the transform execution service 104. Further, through the registration process, the customer may be issued with a set of credentials that may be used by the transform execution service 104 to authenticate the customer.

The set of credentials may include a shared secret established between the customer, via the client device 102, and the transform execution service 104, such as through the use of symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

In an embodiment, the customer, via the client device 102, also maintains a trust relationship with one or more other services 108 provided by a computing resource service provider. For instance, the customer may register with an identity management service of the computing resource service provider to establish an account through which the customer, via the client device 102, may define a set of policies and permissions to establish a level of access to resources of the one or more other services 108. Similar to the registration process described above with regard to the transform execution service 104, the identity management service may issue, to the customer, a set of credentials that may be used by the identity management service to authenticate the customer. For example, if the customer submits a request, through the client device 102, to any of the one or more other services 108, the service may provide the set of credentials of the customer to the identity management service for authentication of the customer. If the identity management service successfully authenticates the customer, the identity management service may identify, from the customer's account, any applicable policies and permissions that may be used by the one or more other services 108 to determine whether the customer is authorized to access the one or more other services 108 and, accordingly, have its request fulfilled.

The set of credentials maintained by the transform execution service 104 and the identity management service that manages access to the one or more other services 108 may be different. For instance, the transform execution service 104 may maintain its own sets of credentials for its customers due to the servers and other resources that are partitioned to create the transformation clusters 106 being shared among the various customers of the transform execution service 104. Thus, as a transformation cluster 106 is released upon completing execution of a set of transform instructions for a particular customer, the transform execution service 104 may revoke these credentials from the transformation cluster 106 and prepare the transformation cluster 106 for use by other customers of the transform execution service 104. However, since a customer's credentials may differ between those used by the transform execution service 104 and used by the one or more other services 108, there may be no trust relationship between the transformation clusters 106 and the one or more other services 108, as the transformation clusters 106 may not have access to the customer's credentials associated with these one or more services 108. Due to the lack of a trust relationship between the transformation clusters 106 and the one or more other services 108, the transform execution service 104 may be unable to fulfill requests from customers to execute transform instructions that involve using resources provided by these one or more other services 108. Thus, a chaining of these sets of credentials may be required in order to allow a trust relationship to be established between a transformation cluster 106 and the one or more other services 108.

Figure 2:
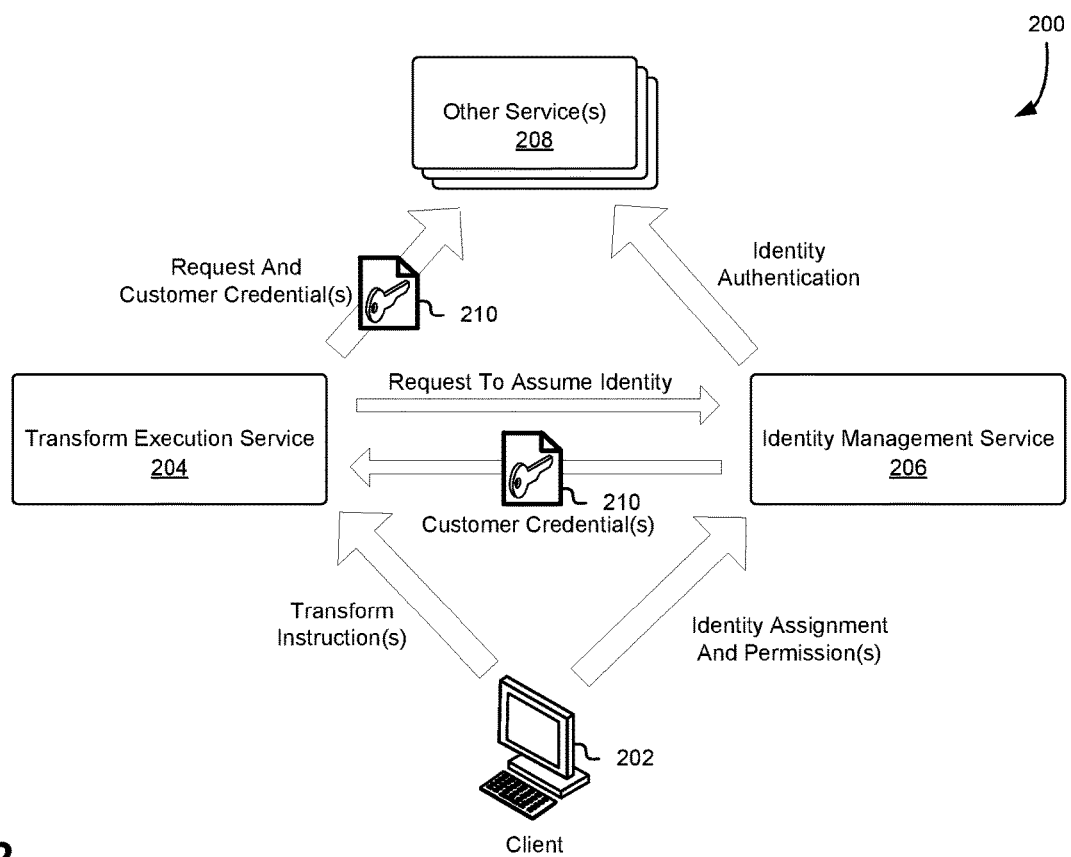
FIG. 2 shows an illustrative example of a system in which various embodiments can be implemented.

FIG. 2 shows an illustrative example of a system 200 in which various embodiments can be implemented. In the system 200, a customer of a transform execution service 204 submits, via a client device 202, a request to the transform execution service 204 to execute a set of transform instructions. In response to the request from the customer, the transform execution service 204 may evaluate the transform instructions provided therein to determine what compute resources may be needed to execute the transform instructions. For instance, the transform execution service 204 may determine, based on the transform instructions, estimated processing, memory, storage capacity, etc. that may be needed for the execution of the transform instructions. In an embodiment, the transform execution service 204 determines, based on the transform instructions, whether access to additional resources provided by other services of the computing resource service provider is required for execution of the transform instructions. For instance, if execution of the transform instructions requires access to a logical data container maintained by an object-based data storage service of the computing resource service provider, the transform execution service 204 may determine that any transformation cluster selected for execution of the transform instructions may require access to the object-based data storage service and to the logical data container to successfully execute the transform instructions. The transform execution service 204 may be provided by one computing resource service provider while the other services that may need to be accessed for execution of the transform instructions may reside in a different computing resource service provider. In other examples, the transform execution service 204 and the other services may be provided by a single computing resource service provider.

In an embodiment, the transform execution service 204 selects a transformation cluster from the fleet of transformation clusters for execution of the transform instructions. Additionally, the transform execution service 204 assigns, from an identity pool maintained by the transform execution service 204, an identity corresponding to the customer and the provided transform instructions. The identity pool may comprise a database of entries, whereby each entry corresponds to a pairing of a customer to the provided transform instructions. Each entry may be keyed off of an identifier, which may be unique to the pairing of the customer to the provided transform instructions. Thus, a customer may be assigned different identities from the identity pool based on the transform instructions provided to the transform execution service 204. The transform execution service 204 may provide, to the customer via the client device 202, an identifier corresponding to the identity assigned to the customer-to-transform instructions pairing. As described in greater detail below, the customer may use this identifier to associate the customer's internal identity maintained by the transform execution service 204 to a customer profile maintained by an identity management service 206 of the computing resource service provider.

Alternatively, in an embodiment, each entry in the database corresponds to a particular customer of the transform execution service 204. Thus, the customer may be assigned with a single identity from the identity pool. Thus, as part of a registration process with the transform execution service 204, the customer may be provided with an identifier corresponding to the customer identity assigned from the identity pool. The customer may thus associate the customer's internal identity maintained by the transform execution service 204 to its customer profile maintained by the identity management service 206. Further, the customer may associate the provided identifier with a particular role that may be assumed by a transformation cluster in order to access the one or more services 208 for execution of the transform instructions.

In an embodiment, the transform execution service 204 generates a cryptographic key pair that can be used to authenticate requests from the transformation cluster assigned to execute the transform instructions to assume a role corresponding to the internal identity of the customer assigned by the transform execution service 204. The transform execution service 204 may provide the private cryptographic key of this cryptographic key pair to the transformation cluster assigned to execute the transform instructions from the customer. Further, the transform execution service 204 may store the public cryptographic key of the cryptographic key pair in a hash table or other repository accessible by the transform execution service 204. The cryptographic key pair may be uniquely associated with the customer-to-transform instructions pairing and the internal identity of the customer.

The transformation cluster may initiate execution of the transform instructions and transmit a request to a sub-system that manages the identity pool to assume the role corresponding to the internal identity of the customer assigned by the transform execution service 204. The request may include a digital signature of the transformation cluster, generated using the private cryptographic key of the cryptographic key pair generated by the transform execution service 204. Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In response to the request to assume the identity of the customer, the sub-system may obtain, from the hash table, the public cryptographic key of the cryptographic key pair and use the public cryptographic key pair to authenticate the request. If the request cannot be authenticated, the sub-system may deny the request from the transformation cluster. However, if the request is successfully authenticated, the sub-system may provide the transformation cluster with a set of identity credentials that may be used by the transformation cluster to assume the role corresponding to the internal identity of the customer. In an embodiment, the set of credentials provided to the transformation cluster may include a second private cryptographic key of a second cryptographic key pair generated by the transform execution service 204. The public cryptographic key of this second cryptographic key pair may be provided to an identity management service 206 to allow the identity management service 206 to authenticate requests from the transformation cluster to assume the role corresponding to the internal identity of the customer.

In an embodiment, the customer, via its client device 202, accesses its customer profile maintained by the identity management service 206 to delegate a customer role to the transformation cluster. For instance, through the customer profile, the customer may define a set of permissions for the customer role that is to be associated with transformation cluster. This set of permissions may be used to define a level of access to resources maintained by one or more other services 208 of the computing resource service provider and associated with the customer profile. Further, through the customer profile, the customer may associate the identifier provided by the transform execution service 204 with an identifier corresponding to the customer role that the transformation cluster may assume in order to access the resources provided by the one or more other services 208 subject to the permissions defined by the customer.

In one embodiment, an identity management service 206 provides access to, and administration of, permissions applicable to requests for access to computing resources (e.g., web service application programming interface requests). In an embodiment, the identity management service 206 receives information sufficient for identifying permissions applicable to pending requests. In some embodiments, the information includes copies of the requests, or is information generated based at least in part on the requests. For instance, if a service 208 receives a request for access to resources, the service 208 may generate a query to the identity management service 206 based at least in part on information specified by the request. The identity management service 206, in an embodiment, is one of a plurality of services provided by a computing resource service provider. In some embodiments, the identity management service 206 is a distributed computer system that centrally manages permissions for multiple services operated by the computing resource service provider as well as identities associated with customers of the computing resource service provider. Requests for access to service resources (i.e., requests whose fulfillment involves access to the resources themselves and/or information about the resources) are evaluated against one or more permissions associated with the request and/or associated with the requester and those requests that are allowable based on those permissions are performed. API calls to create, edit, and/or delete permissions are also received by the identity management service 206. As permissions change, so too does the scope of requests that are allowed to be changed. In an embodiment, an organization has a default set of permissions allowing reads from all storage resources of a certain class. Barring a specific set of permissions restricting a certain user from performing such reads, the default policy would permit such reads by any user. A change to a default set of permissions preventing all reads from that class of storage resource prevents that certain user from reading from such resources, and requires that specific permissions be granted if that user required that access. Granting such permissions requires that the permissions be edited to change the permissions. The identity management service 206, in some examples, may be maintained by the same computing resource service provider of the other services 208. Alternatively, the identity management service 206 may be maintained by a different computing resource service provider, whereby the other services 208 may delegate policy and account management to the identity management service 206 through this different computing resource service provider.

In an embodiment, the transformation cluster transmits a request to the identity management service 206 to obtain a set of customer credentials 210 that may be used by the transformation cluster to assume a customer role (e.g., identity) associated with the customer profile maintained by the identity management service 206. The request from the transformation cluster may be digitally signed using a private cryptographic key of a cryptographic key pair corresponding to the internal identity of the customer generated by the transform execution service 204 in response to the request from the customer to execute transform instructions provided via the client device 202. In response to the request, the identity management service 206 may use the corresponding public cryptographic key of the cryptographic key pair to authenticate the request as being from an entity authorized to assume a role associated with the internal identity of the customer. If the request is successfully authenticated, the identity management service 206 may identify, based on the identifier corresponding to the internal identity of the customer, a customer role that may be assumed by the transformation cluster in order to access the resources maintained by the one or more other services 208.

The identity management service 206, in response to the request from the transformation cluster, may generate a set of customer credentials 210 that may be used by the transformation cluster to assume the customer role. In an embodiment, the customer credentials 210 comprise a cryptographic key pair, of which a private cryptographic key is provided to the transformation cluster to digitally sign requests to the other services 208 and, accordingly, assume the customer role. Additionally, the customer credentials 210 may comprise an identifier associated with the customer role assumed by the transformation cluster.

In an embodiment, the transformation cluster submits a request to one or more other services 208 to access resources provided by these other services 208 and required to execute the transform instructions provided by the customer. The request may include a digital signature generated using the private cryptographic key provided by the identity management service 206 and that may serve as the customer credentials 210 corresponding to the customer role assumed by the transformation cluster. In response to the request, the other service 208 may transmit the customer credentials 210 (e.g., digital signature and identifier corresponding to the customer profile) to the identity management service 206 for authentication. The identity management service 206 may obtain the public cryptographic key of the cryptographic key pair and use the public cryptographic key to authenticate the digital signature. If the digital signature is not valid, the identity management service 206 may transmit a response to the other service 208 to indicate that the transformation cluster cannot be authenticated. This may cause the other service 208 to deny the request from the transformation cluster.

If the identity management service 206 determines that the digital signature is valid, the identity management service 206 may identify, from the customer profile and based on the customer role assumed by the transformation cluster, a set of permissions applicable to the request and to the particular customer role assumed by the transformation cluster. As noted above, these permissions may define a level of access to various resources provided by the one or more other services 208. Thus, the identity management service 206 may provide or otherwise make available the identified set of permissions to the other service 208. In response to obtaining the set of permissions from the identity management service 206, the other service 208 may evaluate the set of permissions and the request from the transformation cluster to determine whether the transformation cluster, assuming the customer role associated with the customer profile maintained by the identity management service 206, is authorized to access the set of resources in conformity with the set of permissions. If the other service 208 determines, based on the set of permissions, that the transformation cluster is not authorized to access the set of resources as requested, the other service 208 may deny the request. However, if the other service 208 determines, based on the set of permissions, that the transformation cluster is authorized to access the set of resources specified in the request, the other service 208 may allow the transformation cluster to access the resources in accordance with the set of permissions.

In an embodiment, the transformation cluster utilizes the resources from the one or more other services 208 to execute the transform instructions provided by the customer. If the transform instructions are executed successfully by the transformation cluster, the transformation cluster may transmit a notification to the transform execution service 204 to indicate that execution of the transform instructions has been completed and terminate the customer session for the transformation cluster, thereby releasing the cluster of compute nodes for use by other customers of the transform execution service 204. In response to this notification, the transform execution service 204 may provide the output resulting from execution of the transform instructions to the client device 202 to fulfill the customer request. Further, the transform execution service 204 may release the internal identity of the customer and revoke the cryptographic key pairs (e.g., credentials for assuming the internal identity role and credentials for accessing the identity management service 206). Thus, the transformation cluster may become available for other customers for use in execution of other transform instructions from other customers.

Figure 3:
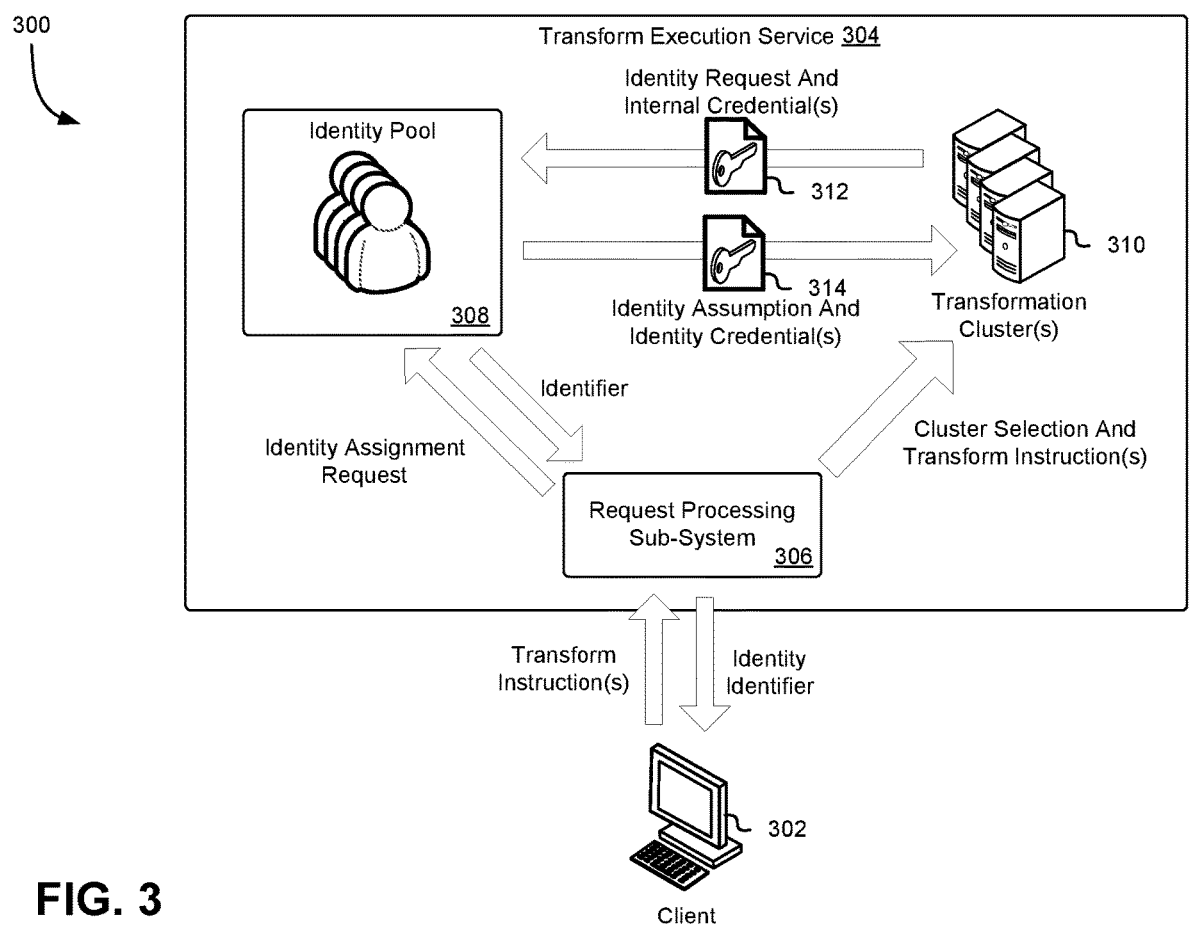
FIG. 3 shows an illustrative example of a system in which a transformation cluster obtains transform instructions from a client and a set of identity credentials to enable the transformation cluster to assume an internal identity of a customer in accordance with at least one embodiment.

FIG. 3 shows an illustrative example of a system 300 in which a transformation cluster 310 obtains transform instructions from a client 302 and a set of identity credentials 314 to enable the transformation cluster 310 to assume an internal identity of a customer in accordance with at least one embodiment. In the system 300, a customer, via a client device 302, submits a request to a request processing sub-system 306 of the transform execution service 304 to provision a transformation cluster 310 for execution of a set of transform instructions. The request processing sub-system 306 is implemented using hardware and software of the transform execution service 304 or virtualization thereof (such as one or more virtual machines operating via a hypervisor) and can comprise one or more processors and memory that stores executable instructions whose execution by the one or more processors causes the computer system to perform operations described herein. In an embodiment, the request processing sub-system 306 assigns an identity corresponding to the customer and the obtained transform instructions from an identity pool 308 maintained by the transform execution service 304. As noted above, the identity pool 308 may comprise a database that includes, for each customer-to-transform instructions pairing, an entry that serves as an internal identity for the particular customer request that is to be fulfilled using a transformation cluster 310. In addition to the database, the identity pool 308 may comprise one or more processors and memory that stores executable instructions whose execution by the one or more processors causes a computer system to perform operations described herein.

The request processing sub-system 306 may obtain, from the identity pool 308, an identifier corresponding to the identity assigned to the customer-to-transform instructions pairing and that serves as an internal identity of the customer within the transform execution service 304. The customer may update their customer profile maintained by the identity management service to associate this identity, through the identifier, with a customer role that may be assumed by the transformation cluster 310 in order to access resources maintained by one or more other services of a computing resource service provider. In an embodiment, the identity pool 308 also generates a cryptographic key pair corresponding to the identity, which may serve as identity credentials 314 corresponding to the identity assigned to the customer-to-transform instructions pairing by the identity pool 308.

In an embodiment, the request processing sub-system 306 evaluates the obtained transform instructions to determine what compute resources (e.g., memory, processors, storage capacity, etc.) may be required to process and execute the transform instructions. Based on this determination, the request processing sub-system 306 may evaluate the fleet of transformation clusters 310 to identify a transformation cluster comprising compute resources sufficient for processing and executing the obtained transform instructions. The request processing sub-system 306 may also generate a cryptographic key pair corresponding to a set of internal credentials 312 that may be used for authentication of the selected transformation cluster 310 and to identify the customer-to-transform instructions pairing assigned to the transformation cluster 310 by the request processing sub-system 306. The request processing sub-system 306 may provide, to the selected transformation cluster 310, a private cryptographic key of this cryptographic key pair or the set of internal credentials 312, which the transformation cluster 310 may use to digitally sign requests to assume the identity corresponding to the customer-to-transform instructions pairing generated by the identity pool 308. The request processing sub-system 306 may store the public cryptographic key of the cryptographic key pair in a hash table or other repository available to the identity pool 308. The identity pool 308 may obtain this public cryptographic key from the hash table or other repository to authenticate requests from the transformation cluster 310. It should be noted that while asymmetric cryptographic keys are used extensively throughout the present disclosure for the purpose of illustration, other cryptographic methods may be used for authentication including, but not limited to, symmetric cryptographic keys, shared secrets, and the like.

The transformation cluster 310 may determine, based on the evaluation performed by the request processing sub-system 306, whether access to other services provided by a computing resource service provider is required in order to access other execute the transform instructions. If such access is required, the transformation cluster 310 may submit a request to the identity pool 308 to assume the internal identity corresponding to the customer and provided to the client device 302 for association with a customer role within the computing resource service provider environment. In an embodiment, the transformation cluster 310, in the request to the identity pool 308 to assume the identity corresponding to the customer-to-transform instructions pairing, demonstrates that the transformation cluster 310 has access to the set of internal credentials 312. For example, using the private cryptographic key generated by the request processing sub-system 306 and corresponding to the set of internal credentials 312, the transformation cluster 310 may generate a digital signature of the transformation cluster 310 to demonstrate that the transformation cluster 310 has access to the set of internal credentials 312.

In response to the request from the transformation cluster 310, the identity pool 308 may obtain the public cryptographic key from the hash table or other repository and use the public cryptographic key to determine whether the internal credentials 312 (e.g., digital signature, etc.) provided by the transformation cluster 310 is authentic. If the internal credentials 312 provided by the transformation cluster 310 cannot be authenticated, the identity pool 308 may deny the request from the transformation cluster 310. However, if the internal credentials 312 are authenticated by the identity pool 308, the identity pool 308 may allow the transformation cluster 310 to assume the identity assigned to the customer-to-transform instructions pairing (e.g., internal customer identity). For instance, the identity pool 308 may provide, to the transformation cluster 310, a set of identity credentials 314 associated with the internal customer identity assigned by the identity pool 308 to the customer-to-transform instructions pairing. This set of identity credentials 314 may include a second private cryptographic key of a second cryptographic key pair, where the second private cryptographic key pair may be used by the transformation cluster 310 to digitally sign requests to an identity management service to assume the customer role defined by the customer. The public cryptographic key of this second cryptographic key pair may be provided, by the transform execution service 304, to the client device 302 along with the identity identifier. Thus, the customer, through the client device 302, may provide the identifier corresponding to the internal customer identity and this public cryptographic key to the identity management service. Alternatively, the transform execution service 304 may provide the public cryptographic key to the identity management service, along with the identifier corresponding to the internal customer identity, to cause the identity management service to associate the public cryptographic key with the internal customer identity identifier and to authenticate requests digitally signed using the private cryptographic key corresponding to the cryptographic key pair associated with the internal customer identity.

Figure 4:
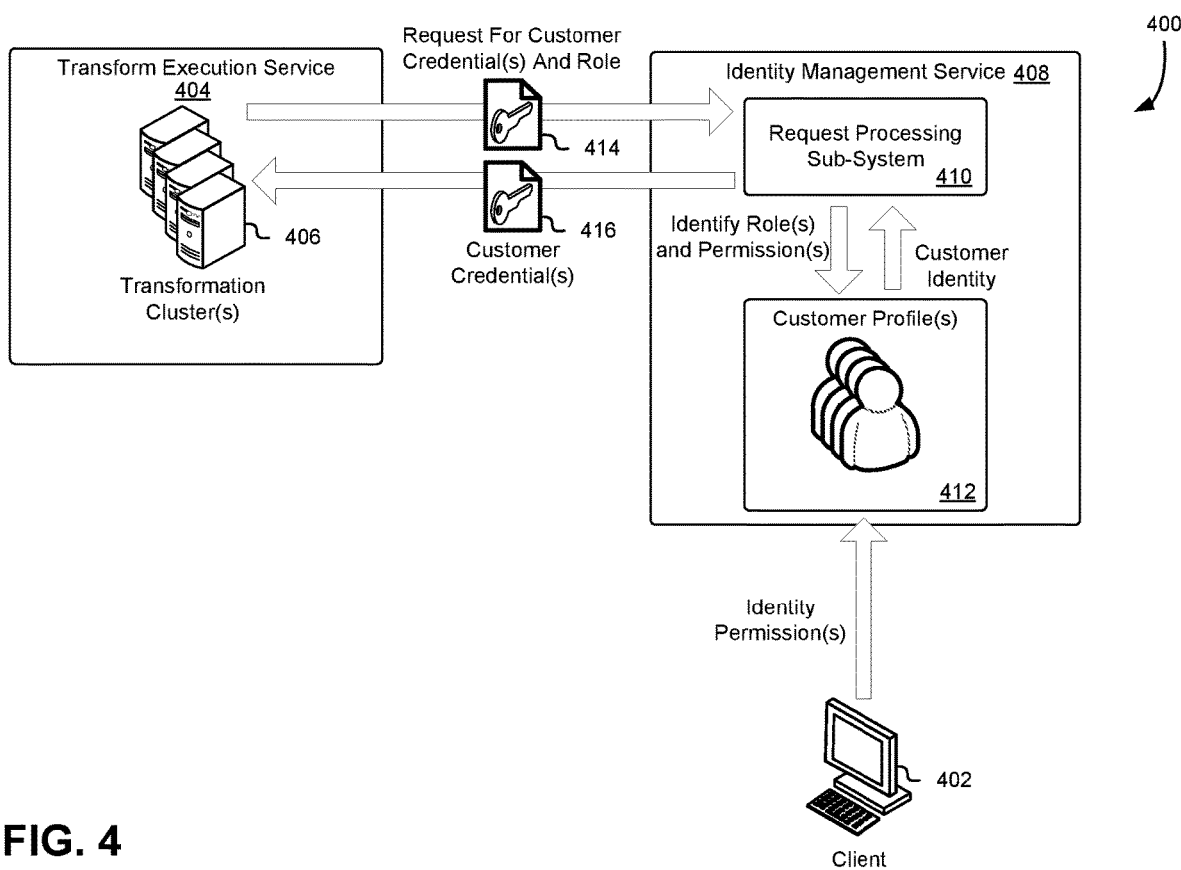
FIG. 4 shows an illustrative example of a system in which a transformation cluster obtains a set of customer credentials from an identity management service to enable the transformation cluster to assume a computing resource service provider identity of a customer in accordance with at least one embodiment.

FIG. 4 shows an illustrative example of a system 400 in which a transformation cluster 406 obtains a set of customer credentials 416 from an identity management service 408 to enable the transformation cluster 406 to assume a computing resource service provider identity of a customer in accordance with at least one embodiment. In the system 400, a transformation cluster 406 of a transform execution service 404 transmits a request to a request processing sub-system 410 of an identity management service 408 to assume a customer role, through which the transformation cluster may access resources provided by one or more other services of a computing resource service provider. In an embodiment, the request may include a set of identity credentials 414 associated with the internal customer identity assigned by an identity pool of the transform execution service 404. The set of identity credentials 414 may be provided in the form of a digital signature. For instance, the request to the request processing sub-system 410 may be digitally signed using a private cryptographic key of a cryptographic key pair associated with the internal customer identity assigned by the identity pool of the transform execution service 404. The request processing sub-system 410 is implemented using hardware and software of the identity management service 408 or virtualization thereof (such as one or more virtual machines operating via a hypervisor) and can comprise one or more processors and memory that stores executable instructions whose execution by the one or more processors causes the computer system to perform operations described herein.

In response to the request from the transformation cluster 406, the request processing sub-system 410 may identify a customer profile 412 of the customer that submitted the original request to the transform execution service 404 for execution of the transform instructions. For instance, the request from the transformation cluster 406 may include an identifier corresponding to the internal customer identity that the transformation cluster 406 has assumed. As noted above, the customer, through its client device 402, may provide the identifier corresponding to the internal customer identity to the identity management service 408 to associate the internal customer identity with a customer profile 412 of the customer. In an embodiment, the customer, through the client device 402, also provides, to the identity management service 408, a set of permissions or policies that may be used to define a level of access to the customer's resources maintained by other services of the computing resource service provider. This set of permissions or policies may be associated with identifier corresponding to the internal customer identity assigned by the transform execution service 404. Further, the customer, via the client device 402, may assign the internal customer identity to a customer role in the customer profile 412. This may enable the transformation cluster to assume the customer role and access the one or more other services provided by the computing resource service provider in accordance with the set of permissions or policies associated with the customer role. In an embodiment, the customer assigns the internal customer identity to the customer role in the customer profile 412 upon obtaining the identifier from the transform execution service 404 during a registration process with the transform execution service 404. Thus, the internal customer identity may be associated with the customer role in the customer profile 412 prior to the provisioning of a transformation cluster 406 for execution of the transform instructions.

In an embodiment, the set of policies are collections of permissions associated with a user, a group, a role, an organization, a company, or some other such entity. Each permission, in an embodiment, is associated with a computing resource and specifies whether the entity (also referred to herein as a "principal") is authorized to access that resource, under what conditions access is allowed or denied, and/or what type of access is allowed or denied. In an embodiment, a permission specifies that a user named "USER1" is authorized to access a certain data storage device denoted by identifier "12345." A more detailed permission can specify that USER1 is authorized to only read from resource 12345, but is not authorized to write to resource 12345. A still more detailed permission can specify that USER1 is authorized to read from resource 12345 at any time, but is only authorized to write to resource 12345 between the hours of 9:00 and 9:30 AM. Permissions, in an embodiment, are also associated with classes or collections of resources so that, for example, USER1 has access to a collection of data storage devices, one of which is resource 12345. Principals, in an embodiment, include individual users, accounts, computing resource services, or other principal entities that are allowed or denied access to a computing resource.

These policies, in an embodiment, are maintained by the identity management service 408 and are stored in a policy database. In an embodiment, the customer, via the client device 402, transmits a request to the identity management service 408 using one or more application programming interface (API) calls to request creation of a principal and attachment of one or more access control policies to the principal. The policies, in an embodiment, are used to establish, for one or more users of the customer account, a level of access to one or more resources provisioned by or for the organization and, generally, access rights with respect to the one or more resources provisioned by/for the organization. The organization, in an embodiment, is a user of a computing resource service provider that utilizes one or more services such as a virtual computer system service, object-based data storage services, database services, a policy management service and configuration and management service as well as a plurality of other services to create and manage resources and to support operational needs.

In an embodiment, in response to the request from the customer to create a new principal (e.g., customer role to be assumed by the transformation cluster 406 that has assumed the internal customer identity) within the user account and to associate one or more access control policies to this new principal, the identity management service 408 parses the request to identify the name of the requested principal, and the requested policies that are to be associated with the principal. Further, the identity management service 408 associates the identifier of the internal customer identity with the customer role that is the new principal associated with the set of policies and permissions defined by the customer. In an embodiment, the customer, via the client device 402, provides a public cryptographic key corresponding to a cryptographic key pair associated with the internal customer identity within the transform execution service 404. This public cryptographic key may be used to authenticate the request from the transformation cluster 406 to assume the customer role.

In an embodiment, the request processing sub-system 410 obtains, from the customer profile or other user account associated with the customer, the public cryptographic key corresponding to the identifier of the internal customer identity provided in the request. The request processing sub-system 410 may use this public cryptographic key to authenticate the set of identity credentials 414. If the request processing sub-system 410 is unable to authenticate the request from the transformation cluster 406, the request processing sub-system 410 may deny the request. However, if the request processing sub-system 410 successfully authenticates the request from the transformation cluster 406, the request processing sub-system 410 may access the customer profile 412 or other user account to identify the customer role that the transformation cluster 406 may assume, as well as any other applicable policies and permissions that may be used to determine the level of access to customer resources maintained by the one or more other services of the computing resource service provider. If the request processing sub-system 410 determines that the transformation cluster 406 may assume a customer role, the request processing sub-system 410 may generate a set of customer credentials 416 that the transformation cluster 406 may use to assume the customer role and access the one or more other services. For instance, the request processing sub-system 410 may generate another cryptographic key pair corresponding to the customer role and provide the private cryptographic key pair to the transformation cluster 406. The transformation cluster 406 may use this private cryptographic key to digitally sign requests to these other services to indicate that it is assuming the customer role. The request processing sub-system 410 may store the public cryptographic key of this cryptographic key pair within the customer profile 412 to authenticate requests from the transformation cluster 406 to these other services.

Figure 5:
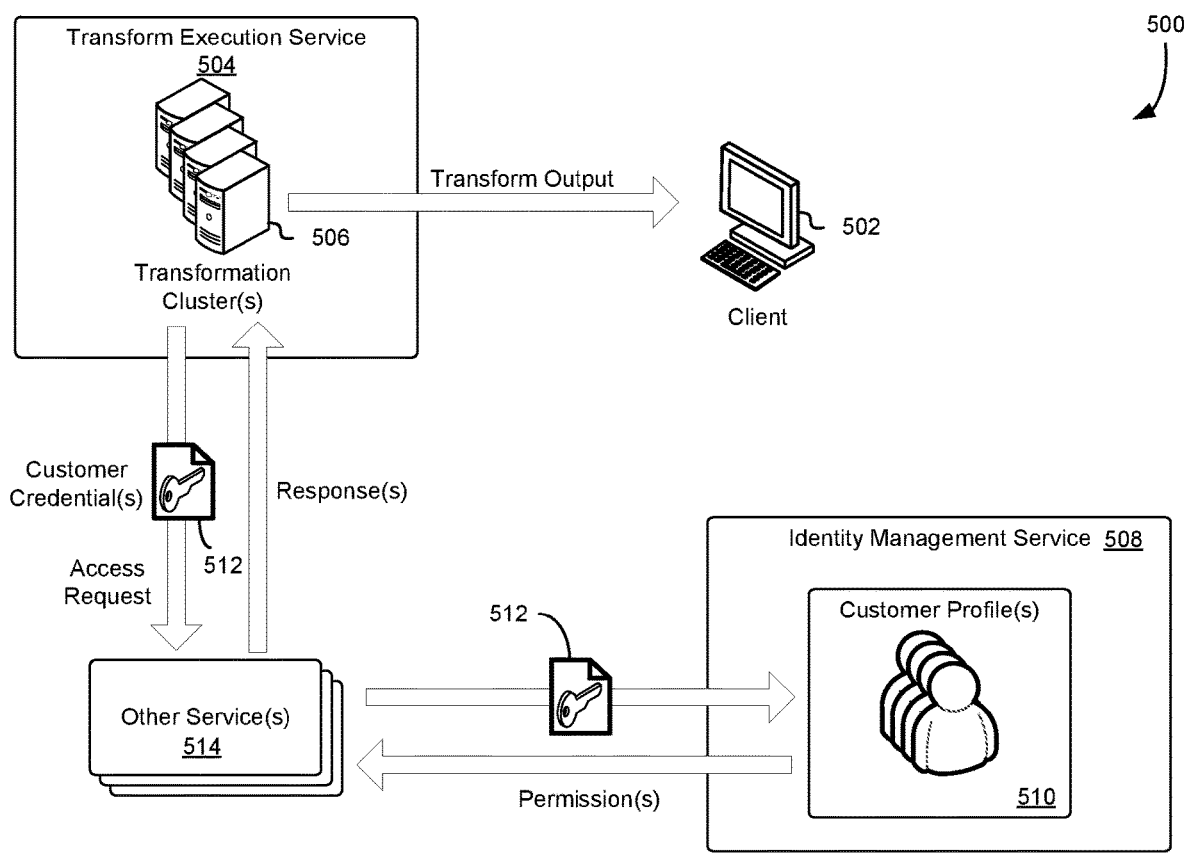
FIG. 5 shows an illustrative example of a system in which a transformation cluster assumes a computing resource service provider identity of a customer in order to access one or more services provided by the computing resource service provider on behalf of the customer for execution of the transform instructions in accordance with at least one embodiment.

FIG. 5 shows an illustrative example of a system 500 in which a transformation cluster 506 assumes a computing resource service provider identity of a customer (e.g., customer role) in order to access one or more services 514 provided by the computing resource service provider on behalf of the customer for execution of the transform instructions in accordance with at least one embodiment. In the system 500, a transformation cluster 506 of a transform execution service 504 transmits a request to one or more services 514 of a computing resource service provider to access a set of resources of the customer that may be used to execute the transform instructions obtained by the transformation cluster 506. The request may include a set of customer credentials 512 associated with a customer role that may be assumed by the transformation cluster 506 to access the set of resources. In an embodiment, the set of customer credentials 512 include a digital signature, created using a private cryptographic key of a cryptographic key pair corresponding to the customer role specified in the customer profile 510 of the customer.

In response to the request, the one or more services 514 may transmit the set of customer credentials 512 to the identity management service 508 for authentication and to obtain a set of policies or permissions usable to determine whether access to the specified set of resources should be granted to the transformation cluster 506. In response to obtaining the set of customer credentials 512 from the one or more other services 514, the identity management service 508 may access the customer profile 510 associated with the customer role that the transformation cluster 506 has indicated it wants to assume. From this customer profile 510, the identity management service 508 may obtain a public cryptographic key of the cryptographic key pair corresponding to the customer role specified in the customer profile 510 and indicated by the transformation cluster 506 in its request. Using the public cryptographic key, the identity management service 508 may authenticate the set of customer credentials 512 and indicate that the transformation cluster 506 is permitted to assume the customer role.

In an embodiment, if the identity management service 508 successfully authenticates the set of customer credentials 512 from the transformation cluster 506, the identity management service 508 identifies, from the customer profile 510, any applicable policies and permissions that may be used by the one or more services 514 to determine whether the transformation cluster 506 is authorized to access the requested resources. For instance, the identity management service 508 may query the customer profile 510 to identify any access control policies that have, as their principal, an identifier corresponding to the customer role that the transformation cluster 506 is to assume in order to access the one or more services 514. For instance, the identity management service 508 may identify, from the customer profile 510, any policies that specify, as the principal, the customer role that the transformation cluster 506 is to assume. Additionally, the identity management service 508 may identify any policies that are also applicable to the requested resources themselves. The identity management service 508 may provide any identified policies and permissions to the one or more other services 514.

In response to obtaining the set of policies and permissions from the identity management service 508, the one or more other services 514 may evaluate this set of policies and permissions to determine whether the transformation cluster 506, assuming the customer role, is authorized to access the resources specified in its request. For instance, if the request from the transformation cluster 506 specifies that the transformation cluster 506 is to perform read and write operations on a particular resource, the one or more other services 514 may evaluate the set of policies and permissions to determine whether the transformation cluster 506 is authorized to do (e.g., a policy indicates that an entity assuming the customer role is authorized to perform such read and write operations on the named resource, a policy does not include a specific prohibition to the performance of such read and write operations, etc.).

If the one or more other services 514 determine that the transformation cluster 506 is not authorized to access the requested resources and to perform the specified operations using these resources, the one or more other services 514 may deny the request from the transform execution service 504. However, if the one or more other services 514 determine that the transformation cluster 506 is authorized to access the requested resources and to perform the specified operations, the one or more other services 514 may transmit a response to the transformation cluster 506 to indicate that access has been granted. This may cause the transformation cluster 506 to access, through the one or more other services 514, the resources needed to execute the transform instructions.

The transformation cluster 506 may provide the output resulting from execution of the transform instructions to the client device 502 to fulfill the customer request. Additionally, the transformation cluster 506 may indicate, to the request processing sub-system of the transform execution service 504 that the request has been fulfilled. In response to this indication, the request processing sub-system of the transform execution service 504 may revoke the set of internal credentials and the set of identity credentials previously provided to the transformation cluster 506. Further, the request processing sub-system may release the transformation cluster 506 to the pool of shared transformation clusters. This may make the transformation cluster 506 available to other customers without any association to the customer or to the revoked credentials.

Figure 6:
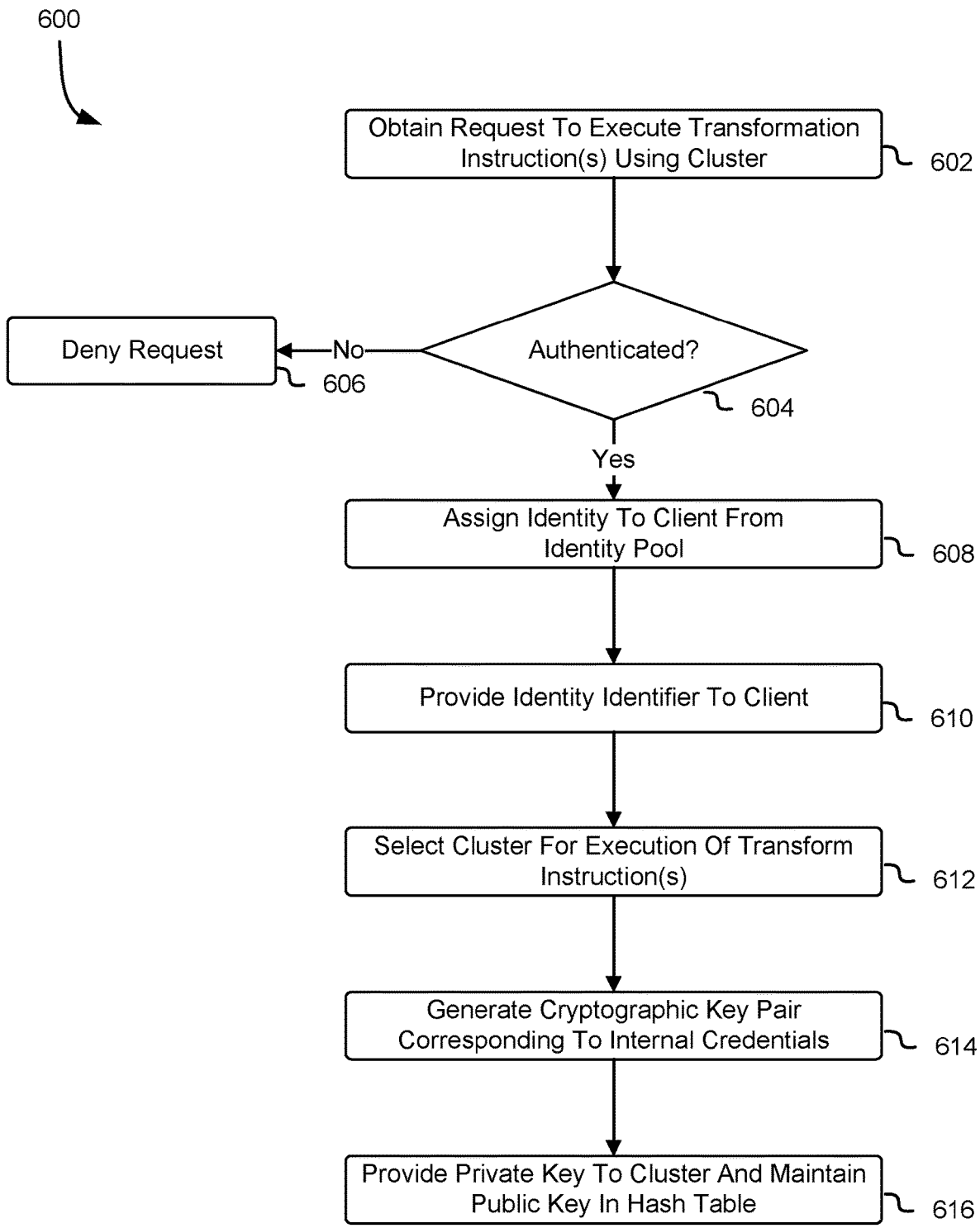
FIG. 6 shows an illustrative example of a process for assigning an internal identity to a customer from an identity pool and selecting a cluster for execution of a set of transform instructions from the customer in accordance with at least one embodiment.

FIG. 6 shows an illustrative example of a process 600 for assigning an internal identity to a customer from an identity pool and selecting a cluster for execution of a set of transform instructions from the customer in accordance with at least one embodiment. The process 600 may be performed by a transform execution service, which may maintain a fleet of transformation clusters that serve as a shared pool of compute resources for executing transform instructions on behalf of customers of the transform execution service. In an embodiment, the transform execution service obtains 602 a request to execute a set of transformation instructions using a transformation cluster of the fleet of transformation clusters. The request may specify an identifier of a customer, as well as the transform instructions that are to be executed by a transformation cluster. Additionally, the request may specify a set of resources made available through one or more other services of a computing resource service provider or another entity, where this set of resources may be required in order to execute the transform instructions.

The request may also include a set of credentials of a customer of the transform execution service. This set of credentials may have been provided to the customer during an account registration process and may be unique to the customer and/or to a set of entities associated with the customer (e.g., employees, groups, organizations, etc.). In response to the request, the transform execution service may evaluate the provided set of credentials to determine 604 whether the request can be authenticated. For instance, if the set of credentials are invalid or otherwise cannot be used to authenticate the customer, the transform execution service may deny 606 the request. In some instances, the set of credentials may be used to digitally sign the request. Thus, the transform execution service may use a known set of credentials for the customer to validate the digital signature. If the digital signature is not valid, the transform execution service may determine that the request cannot be authenticated and deny 606 the request.

If the request is successfully authenticated by the transform execution service, the transform execution service may assign 608 an identity to the customer from an identity pool maintained by the transform execution service. A customer may be assigned with different identities from the identity pool based on the transform instructions provided to the transform execution service. Thus, the transform execution service may provide 610, to the customer via the client device, an identifier corresponding to the identity assigned to the customer-to-transform instructions pairing. This identifier may be used by the customer to associate the customer's internal identity maintained by the transform execution service to a customer profile maintained by an identity management service of the computing resource service provider and, through the customer profile, to a particular customer role that the transformation cluster assigned to the customer may assume to access resources maintained by one or more other services of the computing resource service provider.

In an embodiment, the transform execution service selects 612, from the fleet of transformation clusters, a transformation cluster that may execute the transform instructions provided by the customer. For instance, the transform execution service may evaluate the obtained transform instructions to determine what compute resources (e.g., processors, memory, storage capacity, etc. from the fleet of transformation clusters, etc.) may be required to process and execute the transform instructions. Based on this determination, the transform execution service may evaluate the fleet of transformation clusters to identify a transformation cluster comprising compute resources sufficient for processing and executing the obtained transform instructions.

The transform execution service may also generate 614 a cryptographic key pair corresponding to a set of internal credentials that may be used for authentication of the selected transformation cluster and to identify the customer-to-transform instructions pairing assigned to the transformation cluster by the transform execution service. The transform execution service may provide 616, to the selected transformation cluster, a private cryptographic key of this cryptographic key pair, which the transformation cluster may use to digitally sign requests to assume the identity corresponding to the customer-to-transform instructions pairing generated by the identity pool. The transform execution service may store the public cryptographic key of the cryptographic key pair in a hash table or other repository available to the identity pool. The identity pool may obtain this public cryptographic key from the hash table or other repository to authenticate requests from the transformation cluster.

It should be noted that the process 600 may be performed using additional and/or alternative operations than those illustrated in FIG. 6. In an embodiment, the transform execution service assigns 608 an identity to the client device from the identity pool and provides 610 the identity identifier to the client device prior to obtaining the request to execute the transformation instructions. For instance, as part of a registration process to create a customer account associated with the transform execution service, the transform execution service may assign the customer with an identity from the identity pool and provide an identifier corresponding to this identity to the customer once the registration process has been completed. Thus, rather than assigning an identity to the client device from the identity pool in response to a request to execute the transform instructions using a transformation cluster, the transform execution service may identify the identity of the customer for use in generating the cryptographic key pair corresponding to the internal credentials.

Figure 7:
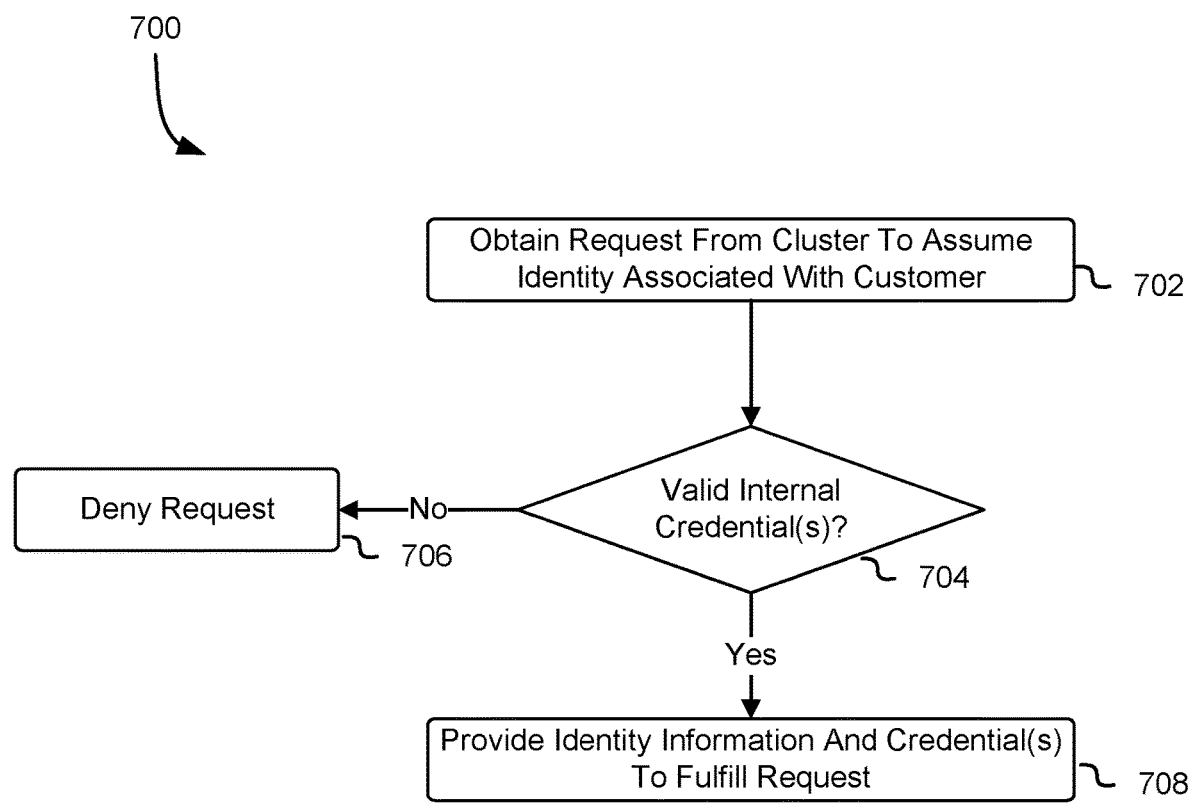
FIG. 7 shows an illustrative example of a process for providing identity credentials to a transformation cluster in response to a request from the transformation cluster to assume an internal identity of a customer in accordance with at least one embodiment.

FIG. 7 shows an illustrative example of a process 700 for providing identity credentials to a transformation cluster in response to a request from the transformation cluster to assume an internal identity of a customer in accordance with at least one embodiment. The process 700 may be performed by a computer system or other process/application associated with an identity pool of the transform execution service. In an embodiment, the computer system associated with the identity pool of the transform execution service obtains 702 a request from a transformation cluster to assume an identity associated with the customer within the transform execution service. The request may include a set of internal credentials corresponding to a pairing of the customer to the transform instructions that are to be executed by the transformation cluster. In an embodiment, the set of internal credentials are generated by the transformation cluster using the private cryptographic key of the cryptographic key pair generated by the transform execution cluster in response to the request from the customer to execute the transform instructions. For instance, the transformation cluster may use the private cryptographic key to digitally sign the request to the computer system to assume the identity of the customer within the transform execution service.

In response to the request, the computer system may determine 704 whether the provided internal credentials are valid. For instance, if the internal credentials provided by the transformation cluster comprise a digital signature generated using the aforementioned private cryptographic key, the computer system may access a hash table or other repository for storage of public cryptographic keys to obtain a public cryptographic key of the cryptographic key pair. Using this public cryptographic key, the computer system may evaluate the digital signature and determine whether it is valid. If the provided internal credentials are not valid or otherwise cannot be authenticated, the computer system may deny 706 the request.

If the internal credentials provided by the transformation cluster are valid, the computer system may provide 708 identity information and a set of identity credentials to the transformation cluster to fulfill the request. This set of identity credentials may include a second private cryptographic key of a second cryptographic key pair, where the second private cryptographic key pair may be used by the transformation cluster to digitally sign requests to an identity management service to assume the customer role defined by the customer. The public cryptographic key of this second cryptographic key pair may be provided, by the transform execution service, to the client device along with the identity identifier. The customer may provide the identifier corresponding to the internal customer identity and this public cryptographic key to the identity management service. Alternatively, the transform execution service may provide the public cryptographic key to the identity management service, along with the identifier corresponding to the internal customer identity, to cause the identity management service to associate the public cryptographic key with the internal customer identity identifier and to authenticate requests digitally signed using the private cryptographic key corresponding to the cryptographic key pair associated with the internal customer identity.

Figure 8:
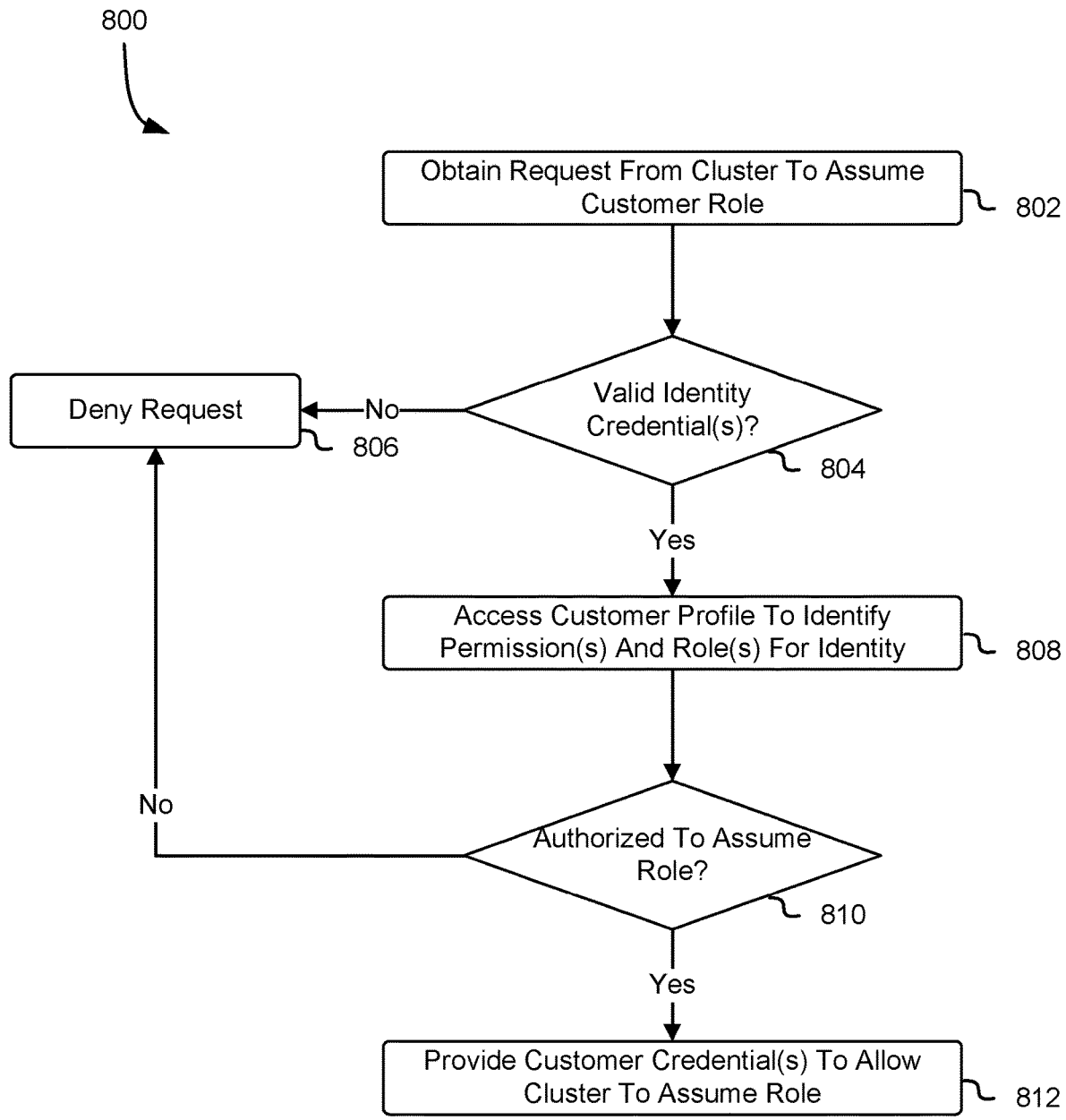
FIG. 8 shows an illustrative example of a process for providing a set of customer credentials to a transformation cluster to allow the transformation cluster to assume a customer role for accessing other services provided by the computing resource service provider in accordance with at least one embodiment.

FIG. 8 shows an illustrative example of a process 800 for providing a set of customer credentials to a transformation cluster to allow the transformation cluster to assume a customer role for accessing other services provided by the computing resource service provider in accordance with at least one embodiment. The process 800 may be performed by the identity management service, which may evaluate a customer profile that maintains a customer role that may be assumed by a transformation cluster. In an embodiment, the identity management service obtains 802 a request from a transformation cluster to assume a particular customer role. The request may include an identifier corresponding to the internal customer identity assigned to the customer-to-transform instructions pairing by the transform execution service. As noted above, a customer of the transform execution service and of the computing resource service provider may update its customer profile within the identity management service to associate this identifier with a particular customer role that may be assumed by a transformation cluster that has assumed the identity corresponding to the identifier. Additionally, the customer may define a set of policies and permissions that are applicable to the customer role.

In an embodiment, the request from the transformation cluster includes a set of identity credentials corresponding to the internal identity of the customer corresponding to the customer-to-transform instructions pairing maintained by the transform execution service. The set of identity credentials may include a digital signature generated using a private cryptographic key of a cryptographic key pair generated by the transform execution service in response to a request from the transformation cluster to assume the internal identity of the customer. The public cryptographic key of this cryptographic key pair may be provided to the identity management service by the customer as it updates its customer profile to associate this internal identity to the particular customer role. Alternatively, the public cryptographic key may be provided by the transform execution service to the identity management service on behalf of the customer.

In response to obtaining the set of identity credentials from the transformation cluster, the identity management service may determine 804 whether these identity credentials are valid. For example, the identity management service may use the public cryptographic key to authenticate the digital signature from the transformation cluster. If the identity management service is unable to authenticate the set of identity credentials from the transformation cluster, the identity management service may deny 806 the request to assume the customer role. However, if the identity management service determines that the set of identity credentials from the transformation cluster are valid, the identity management service may access 808 the customer profile of the customer to identify the customer role that the transformation cluster is authorized to assume, as well as any policies and permissions that may be applicable to this particular customer role. For instance, the request from the transformation cluster may specify an identifier of a customer role that it wishes to assume. Based on the identity assumed by the transformation cluster, the identity management service may evaluate the customer profile to identify the customer roles that may be assumed by an entity claiming the identity. Further, the permissions and policies may specify whether such an identity may assume the requested customer role. Thus, through evaluation of the customer profile and of any applicable policies and permissions, the identity management service may determine 810 whether the transformation cluster is authorized to assume the desired customer role.

If the identity management service determines that the transformation cluster is not authorized to assume the desired customer role, the identity management service may deny 806 the request. Alternatively, if the identity management service determines that the transformation cluster is authorized to assume this customer role, the identity management service may provide 812, to the transformation cluster, a set of customer credentials that may be used by the transformation cluster to assume the customer role. For instance, the identity management service may generate a cryptographic key pair corresponding to the customer role and provide the private cryptographic key pair to the transformation cluster. The transformation cluster may use this private cryptographic key to digitally sign requests to one or more other services provided by the computing resource service provider to indicate that it is assuming the customer role. The identity management service may store the public cryptographic key of this cryptographic key pair within the customer profile to authenticate requests from the transformation cluster to these other services in response to queries, by these other services, to validate the set of customer credentials provided by the transformation cluster.

Figure 9:
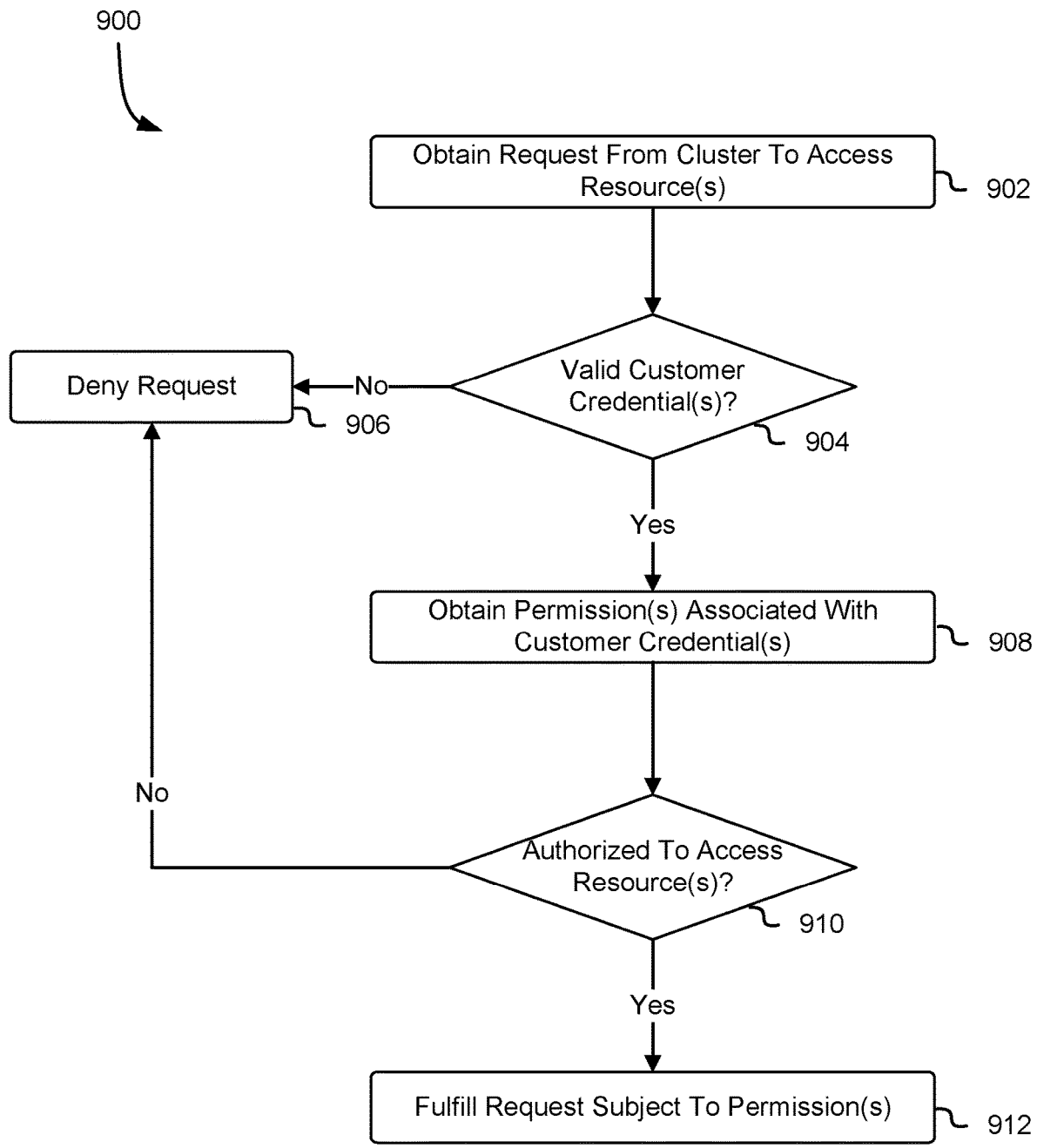
FIG. 9 shows an illustrative example of a process for determining whether to fulfill a request from a transformation cluster to access a set of resources based on a set of permissions associated with a customer role assumed by the transformation cluster in accordance with at least one embodiment.

FIG. 9 shows an illustrative example of a process 900 for determining whether to fulfill a request from a transformation cluster to access a set of resources based on a set of permissions associated with a customer role assumed by the transformation cluster in accordance with at least one embodiment. The process 900 may be performed by any service of a computing resource service provider that may rely on an identity management service to obtain policies and permissions corresponding to a customer role within the computing resource service provider environment. In an embodiment, a service obtains 902 a request from a transformation cluster to access one or more resources provided by the service. For instance, a transformation cluster of a transform execution service may transmit a request to the service to access a set of resources of the customer that may be used to execute the transform instructions obtained by the transformation cluster. The request may include a set of customer credentials associated with a customer role that may be assumed by the transformation cluster to access the set of resources. The set of customer credentials may include a digital signature, created using a private cryptographic key of a cryptographic key pair corresponding to the customer role specified in the customer profile of the customer.

In response to the request from the transformation cluster, the service may determine 904 whether the set of customer credentials provided by the transformation cluster is valid. For instance, the service may transmit the set of customer credentials to the identity management service for authentication and to obtain a set of policies or permissions usable to determine whether access to the specified set of resources should be granted to the transformation cluster. In response to obtaining the set of customer credentials from the service, the identity management service may access the customer profile associated with the customer role that the transformation cluster has indicated it wants to assume. From this customer profile, the identity management service may obtain a public cryptographic key of the cryptographic key pair corresponding to the customer role specified in the customer profile and indicated by the transformation cluster in its request. Using the public cryptographic key, the identity management service may authenticate the set of customer credentials and indicate whether the transformation cluster is permitted to assume the customer role. If the service determines, based on an indication from the identity management service, that the set of customer credentials are not valid or otherwise cannot be authenticated, the service may deny 906 the request.

As noted above, if the identity management service successfully authenticates the set of customer credentials from the transformation cluster, the identity management service may identify, from the customer profile, any applicable policies and permissions that may be used by the service to determine whether the transformation cluster is authorized to access the requested resources. The identity management service may provide any identified policies and permissions to the service, which may obtain 908 these policies and permissions associated with the customer credentials provided by the transformation cluster. In response to obtaining the set of policies and permissions from the identity management service, the service may evaluate this set of policies and permissions to determine 910 whether the transformation cluster, assuming the customer role, is authorized to access the resources specified in its request. If the service determines that the transformation cluster is not authorized to access the requested resources and to perform the specified operations using these resources, the service may deny 906 the request from the transformation cluster. However, if the service determines, based on the policies and permissions applicable to the request, that the transformation cluster is authorized to access the requested resources and to perform the specified operations, the service may transmit a response to the transformation cluster to indicate that access has been granted, thereby fulfilling 912 the request. This may cause the transformation cluster to access, through the service, the resources needed to execute the transform instructions subject to the applicable policies and permissions.

Figure 10:
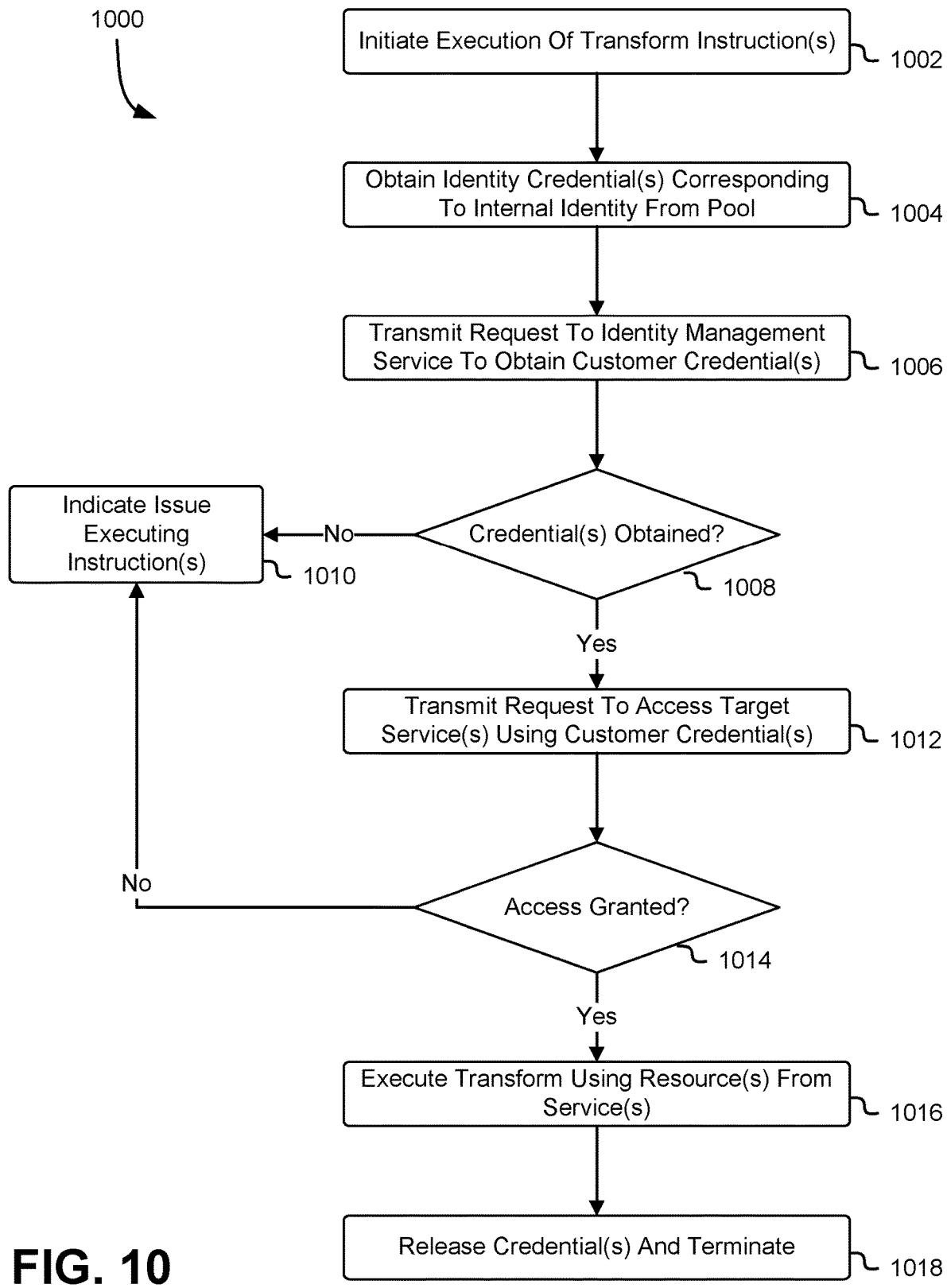
FIG. 10 shows an illustrative example of a process for executing a set of transform instructions and obtaining credentials to access one or more services provided by a computing resource service provider to access resources for executing the transform instructions in accordance with at least one embodiment.

FIG. 10 shows an illustrative example of a process 1000 for executing a set of transform instructions and obtaining credentials to access one or more services provided by a computing resource service provider to access resources for executing the transform instructions in accordance with at least one embodiment. The process 1000 may be performed by a transformation cluster, which may obtain different sets of credentials in order to assume identities tied to a customer of a transform execution service and of a computing resource service provider in order to access resources provided by the one or more services to execute the set of transform instructions submitted by the customer. In an embodiment, the transformation cluster initiates 1002 execution of a set of transform instructions provided by a transform execution service, which may obtain these transform instructions from a customer of the transform execution service. The transformation cluster may obtain, from the transform execution service, a set of internal credentials corresponding to a customer-to-transform instructions pairing. For instance, the transform execution service may generate a cryptographic key pair corresponding to a set of internal credentials that may be used for authentication of the transformation cluster and to identify the customer-to-transform instructions pairing assigned to the transformation cluster by the transform execution service. The transform execution service may provide, to the transformation cluster, a private cryptographic key of this cryptographic key pair, which the transformation cluster may use to digitally sign requests to assume the identity corresponding to the customer-to-transform instructions pairing generated by the identity pool of the transform execution service. The transform execution service may store the public cryptographic key of the cryptographic key pair in a hash table or other repository available to the identity pool. The identity pool may obtain this public cryptographic key from the hash table or other repository to authenticate requests from the transformation cluster.

The transformation cluster may obtain 1004, from the identity pool, a set of identity credentials corresponding to this internal identity corresponding to the customer-to-transform instructions pairing. This set of identity credentials may include a second private cryptographic key of a second cryptographic key pair, where the second private cryptographic key pair may be used by the transformation cluster to digitally sign requests to an identity management service to assume the customer role defined by the customer. The public cryptographic key of this second cryptographic key pair may be provided, by the transform execution service, to the client device of the customer along with the identity identifier. Thus, the customer, through the client device, may provide the identifier corresponding to the internal customer identity and this public cryptographic key to the identity management service. Alternatively, the transform execution service may provide the public cryptographic key to the identity management service, along with the identifier corresponding to the internal customer identity, to cause the identity management service to associate the public cryptographic key with the internal customer identity identifier and to authenticate requests digitally signed using the private cryptographic key corresponding to the cryptographic key pair associated with the internal customer identity.

In response to obtaining the identity credentials from the identity pool, the transformation cluster may transmit 1006 a request to the identity management service to obtain a set of customer credentials in order to assume a particular customer role. The request may include the set of identity credentials obtained from the identity pool. Additionally, the request may specify an identifier corresponding to the internal customer identity, which the identity management service may use to identify any corresponding customer roles that may be assumed by the transformation cluster, as well as any applicable policies and permissions that may be used to determine whether the transformation cluster is authorized to assume these customer roles. As noted above, the identity management service may evaluate the provided identity credentials, as well as any applicable policies and permissions, to determine whether the identity credentials are valid and, if so, whether the transformation cluster may assume the specified customer role. If the transformation cluster is authorized to assume the customer role, the identity management service may provide, to the transformation cluster, a set of customer credentials corresponding to the customer role to the transformation cluster. Alternatively, if the identity credentials cannot be authenticated and/or the transformation cluster is not authorized to assume the desired customer role, the identity management service may transmit a response to the transformation cluster to indicate that it is not authorized to assume the customer role.

Based on the response from the identity management service, the transformation cluster may determine 1008 whether it has obtained the set of customer credentials for assuming the customer role. If the transformation cluster has not obtained this set of customer credentials, the transformation cluster may indicate 1010 an issue in executing the transform instructions since it is unable to assume the customer role and, thus, access the resources required to execute the transform instructions. This may include a notification to the customer and/or to the transform execution service to indicate this particular issue. However, if the transformation cluster has obtained the set of customer credentials from the identity management service, the transformation cluster may transmit 1012 a request to one or more other services provided by the computing resource service provider to access a set of resources that may be needed to execute the transform instructions. As noted above, in response to the request, the one or more services may transmit the set of customer credentials to the identity management service for authentication and to obtain a set of policies or permissions usable to determine whether access to the specified set of resources should be granted to the transformation cluster. If the identity management service successfully authenticates the set of customer credentials from the transformation cluster, the identity management service may identify any applicable policies and permissions that may be used by the one or more services to determine whether the transformation cluster is authorized to access the requested resources.

In response to obtaining the set of policies and permissions from the identity management service, the one or more other services may evaluate this set of policies and permissions to determine whether the transformation cluster, assuming the customer role, is authorized to access the resources specified in its request. If the one or more other services determine that the transformation cluster is not authorized to access the requested resources and to perform the specified operations using these resources, the one or more other services may deny the request from the transform execution service. However, if the one or more other services determine that the transformation cluster is authorized to access the requested resources and to perform the specified operations, the one or more other services may transmit a response to the transformation cluster to indicate that access has been granted. Thus, based on a response from the one or more services, the transformation cluster may determine 1014 whether it has been granted access to the requested resources.

If the transformation cluster determines that it has not been granted access to the requested resources, the transformation cluster may indicate 1010 an issue with executing the transform instructions. Alternatively, if access has been granted, the transformation cluster may execute 1016 the transform instructions using the resources from the one or more services. The transformation cluster may provide the output resulting from execution of the transform instructions to the client device to fulfill the customer request. Additionally, the transformation cluster may indicate, to the transform execution service that the request has been fulfilled. In response to this indication, the transform execution service may release 1018 the set of internal credentials and the set of identity credentials previously provided to the transformation cluster. Further, the transform execution service may release (e.g., terminate) the transformation cluster to the pool of shared transformation clusters. This may make the transformation cluster available to other customers without any association to the customer or to the revoked credentials.

Figure 11:
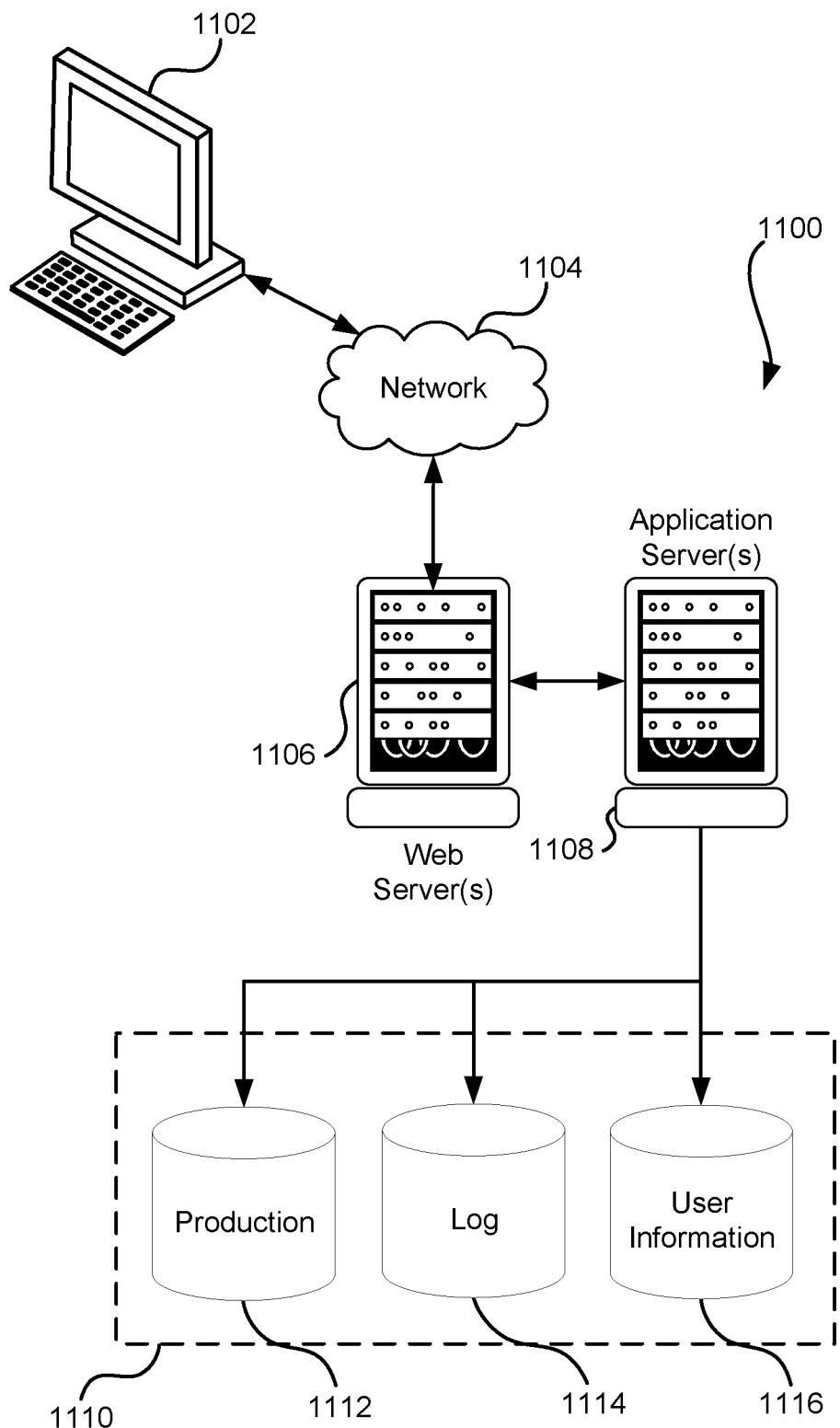
FIG. 11 shows an illustrative example of a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
obtaining a first request to execute a set of instructions, the set of instructions being executable using at least a set of resources provided by a remote service;
in response to the first request and based on the set of instructions, selecting a cluster of compute nodes;
providing, to the cluster of compute nodes, the set of instructions and a first set of credentials corresponding to a pairing of an identifier corresponding to a requestor that submitted the first request to the set of instructions;
obtaining, from the cluster of compute nodes, a second request to assume a first identity of the requestor, the second request including an assertion that the cluster of compute nodes has access to the first set of credentials;
providing, to the cluster of compute nodes, a second set of credentials associated with the first identity of the requestor, the second set of credentials usable by the cluster of the compute nodes to assume the first identity of the requestor; and
providing the second set of credentials to an identity management service associated with the set of resources to cause the identity management service to:
authenticate, using the second set of credentials, a third request from the cluster of compute nodes to assume a role associated with the requestor, the role corresponding to a set of permissions to access the set of resources by assumption of the role; and
provide, to the cluster of compute nodes, a third set of credentials to cause the cluster of compute nodes to assume the role and access the set of resources to execute the set of instructions.

2. The computer-implemented method of claim 1, wherein the computer-implemented method further comprises:
detecting that the cluster of compute nodes completed execution of the set of instructions;
revoking the first set of credentials and the second set of credentials; and
releasing the cluster of compute nodes.

3. The computer-implemented method of claim 1, wherein the computer-implemented method further comprises:
generating, in response to the first request, a cryptographic key pair comprising a private cryptographic key and a public cryptographic key;
providing, to the cluster of compute nodes and as the first set of credentials, the private cryptographic key; and
using the public cryptographic key to authenticate the second request to assume the first identity of the requestor.

4. The computer-implemented method of claim 1, wherein the computer-implemented method further comprises providing, to the requestor, the identifier corresponding to the requestor to cause the requestor to associate the first identity of the requestor and the role.

5. A system, comprising:
one or more processors; and
memory storing computer-executable instructions that are executable by the one or more processors to cause the system to:
obtain a first request to execute a set of instructions associated with a client, the first request including a first set of credentials corresponding to a pairing of an identifier corresponding to the client;
identify a cluster of computer nodes to execute the set of instructions;
determine, based on the set of instructions, a set of resources provided by a remote service to execute the set of instructions;
obtain, from the cluster of compute nodes, a second request to assume a first identity of the client, the second request including an assertion that the cluster of compute nodes has access to the first set of credentials;
provide, to the cluster of compute nodes, a second set of credentials associated with the first identity of the client, the second set of credentials usable by the cluster of the compute nodes to assume the first identity of the client;
store a record of permissions granted to the cluster of compute nodes by an entity associated with the set of resources to allow the cluster of computer nodes to access the set of resources, the record of permissions providing access to the set of resources by assumption of a role associated with the client;
provide, to the cluster of compute nodes, a third set of credentials to cause the cluster of compute nodes to assume the role and access the set of resources to execute the set of instructions; and
during execution of the set of instructions, confirm that the cluster of computer nodes has the permissions required to access the set of resources needed to execute the set of instructions.

6. The system of claim 5, wherein the computer-executable instructions further cause the system to revoke the permissions as a result of execution of the set of instructions.

7. The system of claim 5, wherein the computer-executable instructions that cause the system to identify the cluster of compute nodes further cause the system to:
evaluate the set of instructions to identify compute requirements for execution of the set of instructions; and
select, based on the compute requirements, the cluster of compute nodes.

8. The system of claim 5, wherein the computer-executable instructions further cause the system to:
obtain, from the cluster of compute nodes, a second request including a digital signature generated in accordance with the permissions granted to the cluster of compute nodes; and
use the permissions to authenticate the digital signature.

9. The system of claim 5, wherein the computer-executable instructions further cause the system to:
obtain an indication that the cluster of compute nodes executed the set of instructions; and
in response to the indication, release the cluster of compute nodes.

10. The system of claim 5, wherein the computer-executable instructions further cause the system to:
generate, in response to the request, a cryptographic key pair corresponding to the identity of the client;
provide, to the cluster of compute nodes, a private cryptographic key of the cryptographic key pair; and
use a public cryptographic key of the cryptographic key pair to authenticate a second request from the cluster of compute nodes to assume an identity of the client to access the set of resources.

11. The system of claim 5, wherein the computer-executable instructions further cause the system to assign, from an identity pool, an identity of the entity in response to the request.

12. The system of claim 11, wherein the computer-executable instructions further cause the system to provide, to the client, an identifier corresponding to the identity to cause the client to access the identity management service to grant the permissions to the cluster of computer nodes.

13. A non-transitory computer-readable storage medium storing thereon executable instructions that, as a result of being executed by one or more processors of a computer system, cause the computer system to at least:
provide, to a cluster of compute nodes, in response to a first request to execute a set of instructions, the set of instructions and a first set of credentials corresponding to a pairing of an identifier corresponding to an entity submitting the first request;
obtain a second request to assume an identity of the entity that submitted the first request, the second request demonstrating access to the first set of credentials;
determine, based on the first set of credentials, whether the second request is valid; and
as a result of the second request being valid, provide a second set of credentials associated with the identity to cause the cluster of compute nodes to use the second set of credentials to:
obtain, from an identity management service, a third set of credentials to exercise a set of permissions associated with the entity; and
use the third set of credentials to access a set of resources in accordance with at least a subset of the set of permissions.

14. The non-transitory computer-readable storage medium of claim 13, wherein the executable instructions further cause the computer system to:
evaluate the set of instructions to identify a set of compute requirements to enable execution of the set of instructions; and
select, based on the set of compute requirements, the cluster of compute nodes.

15. The non-transitory computer-readable storage medium of claim 13, wherein the executable instructions further cause the computer system to:
detect that the cluster of compute nodes has completed execution of the set of instructions; and
as a result of the cluster of computing nodes completing the execution of the set of instructions, revoke the first set of credentials and the second set of credentials.

16. The non-transitory computer-readable storage medium of claim 15, wherein the executable instructions that cause the computer system to revoke the first set of credentials and the second set of credentials further cause the computer system to release the cluster of computer nodes to make the cluster of compute nodes available to other entities.

17. The non-transitory computer-readable storage medium of claim 13, wherein:
the first set of credentials comprise a cryptographic key pair, the cryptographic key pair comprising a private cryptographic key and a public cryptographic key;
the second request demonstrating the access to the first set of credentials includes a digital signature generated using the private cryptographic key; and
the executable instructions further cause the computer system to use the public cryptographic key to authenticate the second request.

18. The non-transitory computer-readable storage medium of claim 13, wherein:
the third set of credentials correspond to a role corresponding to the set of permissions; and
using the third set of credentials to access the set of resources causes the cluster of nodes to assume the role.

19. The non-transitory computer-readable storage medium of claim 13, wherein the executable instructions further cause the computer system to:
assign, in response to the first request, the identity of the entity to the entity from an identity pool resulting in an identifier corresponding to the identity; and
provide, to the entity, the identifier to cause the entity to use the identifier to associate the identity of the entity to the set of permissions.

20. The non-transitory computer-readable storage medium of claim 13, wherein the executable instructions further cause the computer system to transmit the second set of credentials to the identity management service to cause the identity management service to use the second set of credentials to authenticate a third request from the cluster of compute nodes to obtain the third set of credentials.

* * * * *